United States Patent
Kitazoe

(10) Patent No.: US 8,451,803 B2
(45) Date of Patent: May 28, 2013

(54) METHODS AND APPARATUS FOR MANAGING MEASUREMENT BEHAVIOR OF DRX MODE UE

(75) Inventor: Masato Kitazoe, Hachiouji (JP)

(73) Assignee: QUALCOMM Incorporated, San Diego, CA (US)

(*) Notice: Subject to any disclaimer, the term of this patent is extended or adjusted under 35 U.S.C. 154(b) by 343 days.

(21) Appl. No.: 12/244,650

(22) Filed: Oct. 2, 2008

(65) Prior Publication Data

US 2009/0092056 A1    Apr. 9, 2009

Related U.S. Application Data

(60) Provisional application No. 60/977,860, filed on Oct. 5, 2007.

(51) Int. Cl.
| H04W 52/02 | (2009.01) |
| H04W 36/26 | (2009.01) |
| H04W 36/30 | (2009.01) |
| H04W 4/00  | (2009.01) |

(52) U.S. Cl.
USPC ........... 370/332; 370/338; 370/311; 455/444; 455/452.1

(58) Field of Classification Search
USPC ................. 370/252, 311, 331–334, 330, 338; 455/432.1, 436, 437, 444, 450, 452.1
See application file for complete search history.

(56) References Cited

U.S. PATENT DOCUMENTS

| 7,480,519 B2* | 1/2009 | Jeong et al. ............... 455/525 |
| 8,045,989 B2* | 10/2011 | Joo ................ 455/446 |
| 8,068,834 B2* | 11/2011 | Amerga et al. .............. 455/436 |
| 8,238,260 B2* | 8/2012 | Terry et al. ............... 370/252 |
| 8,243,665 B2* | 8/2012 | Lee et al. ............... 370/329 |
| 2003/0153370 A1* | 8/2003 | Sako ............... 455/574 |
| 2006/0126577 A1* | 6/2006 | Yano et al. ............... 370/337 |
| 2007/0291729 A1* | 12/2007 | Dalsgaard et al. ........... 370/347 |
| 2008/0076427 A1* | 3/2008 | Huang et al. ............... 455/436 |
| 2008/0160918 A1* | 7/2008 | Jeong et al. ............... 455/67.11 |
| 2008/0189970 A1* | 8/2008 | Wang et al. ............... 33/701 |
| 2008/0207195 A1* | 8/2008 | Ranta et al. ............... 455/423 |
| 2009/0034452 A1* | 2/2009 | Somasundaram et al. .... 370/328 |
| 2009/0088160 A1* | 4/2009 | Pani et al. ............... 455/436 |
| 2009/0168662 A1 | 7/2009 | Tsuboi et al. |

FOREIGN PATENT DOCUMENTS

| JP | 2005537752 A | 12/2005 |
| JP | 2007089008 A | 4/2007 |
| JP | 2007202096 A | 8/2007 |

(Continued)

OTHER PUBLICATIONS

Taiwan Search Report—TW097138331—TIPO—Feb. 22, 2012.

(Continued)

*Primary Examiner* — Chi Pham
*Assistant Examiner* — Ahmed Elallam
(74) *Attorney, Agent, or Firm* — Kam T. Tam

(57) ABSTRACT

Systems and methods that manage measurement behavior of a UE in connected mode and while in discontinuous operation. The UE is enabled to autonomously (e.g., independent of instructions from network) enter a state of measurement, and generate a measurement report for the network, when quality of serving cell falls below the threshold of S_Intrasearch parameter. Moreover, the UE can perform inter-frequency and/or inter-RAT measurements autonomously by employing the "natural gaps" from its DRX pattern, when such are adequate to perform such measurements.

30 Claims, 11 Drawing Sheets

FOREIGN PATENT DOCUMENTS

| WO | WO9943178 | 8/1999 |
|----|-----------|--------|
| WO | WO0070897 | 11/2000 |
| WO | WO2004021731 | 3/2004 |
| WO | WO2007017733 A2 | 2/2007 |
| WO | WO2007091677 A1 | 8/2007 |
| WO | WO2007111185 A1 | 10/2007 |

OTHER PUBLICATIONS

3GPP; Technical Specification Group Radio Access Network;: "TS 36.300 V8.2.0—Evolved Universal Terrestrial Radio Access (E-UTRA) and Evolved Universal Terrestrial Radio Access Network (E-UTRAN); Overall description; Stage 2" 3rd Generation Partnership Project: Technical Specification (TS), vol. 36.300, No. v8.2.0, Sep. 1, 2007, XP002595686.

International Search Report and Written Opinion—PCT/US2008/078784, International Search Authority—European Patent Office—Aug. 26, 2010.

NTT Docomo et al: "Measurement gap control" 3GPP Draft; R2-073369 Measurement Gap Control, 3rd Generation Partnership Project (3GPP), Mobile Competence Centre; 650, Route Des Lucioles; F-06921 Sophia-Antipolis CEDEX; France, vol. RAN WG2, No. Athens, Greece; 20070817, Aug. 17, 2007, XP050136077.

Technical Specification Group Radio Access Network;: "3GPP TS 25.304 V7.2.0 (Jun. 2007); User Equipment (UE) procedures in idle mode and procedures for cell reselection in connected mode (Release 7)" 3rd Generation Partnership Project (3GPP); Technical Specification (TS), vol. 25.304, No. V7.2.0, Jun. 1, 2007, pp. 1-41, XP002595787.

* cited by examiner

METHODS AND APPARATUS FOR MANAGING MEASUREMENT BEHAVIOR OF DRX MODE UE

CLAIM OF PRIORITY UNDER 35 U.S.C. §119

The present Application for Patent claims priority to Provisional Application No. 60/977,860 entitled "MEASUREMENT BEHAVIOUR OF DRX MODE UE" filed on Oct. 5, 2007 and assigned to the assignee hereof and hereby expressly incorporated by reference herein.

BACKGROUND

I. Field

The following description relates generally to wireless communications, and more particularly to utilizing varying sleep modes to facilitate reducing power consumption by a communication device in a wireless communication system.

II. Background

Wireless communication systems are widely deployed to provide various types of communication; for instance, voice and/or data can be provided via such wireless communication systems. A typical wireless communication system, or network, can provide multiple users access to one or more shared resources (e.g., bandwidth, transmit power, ... ). For instance, a system can use a variety of multiple access techniques such as Frequency Division Multiplexing (FDM), Time Division Multiplexing (TDM), Code Division Multiplexing (CDM), Third Generation Partnership Project (3GPP) Long-Term Evolution (LTE) systems, Orthogonal Frequency Division Multiplexing (OFDM), and others.

Generally, wireless multiple-access communication systems can simultaneously support communication for multiple mobile devices. Each mobile device can communicate with one or more base stations via transmissions on forward and reverse links. The forward link (or downlink) refers to the communication link from base stations to mobile devices, and the reverse link (or uplink) refers to the communication link from mobile devices to base stations. This communication link can be established via a single-in-single-out, multiple-in-signal-out, or a multiple-in-multiple-out (MIMO) system.

For instance, a MIMO system can employ multiple ($N_T$) transmit antennas and multiple ($N_R$) receive antennas for data transmission. A MIMO channel formed by the $N_T$ transmit and $N_R$ receive antennas can be decomposed into $N_S$ independent channels, which are also referred to as spatial channels, where $N_S \leq \min\{N_T, N_R\}$. Each of the $N_S$ independent channels can correspond to a dimension. The MIMO system can provide improved performance (e.g., higher throughput and/or greater reliability) if the additional dimensionalities created by the multiple transmit and receive antennas are utilized.

A MIMO system can support a time division duplex (TDD) and frequency division duplex (FDD) systems. In a TDD system, the forward and reverse link transmissions can be on the same frequency region so that the reciprocity principle allows the estimation of the forward link channel from the reverse link channel. This can enable the access point to extract transmit beamforming gain on the forward link when multiple antennas are available at the access point Wireless communication systems often times employ one or more base stations that provide a coverage area. A typical base station can transmit multiple data streams for broadcast, multicast and/or unicast services, wherein a data stream may be a stream of data that can be of independent reception interest to a mobile device. A mobile device within the coverage area of such base station can be employed to receive one, more than one, or all the data streams carried by the composite stream. Likewise, a mobile device can transmit data to the base station or another mobile device.

Typically, mobile devices utilize power (e.g., battery power) while turned on as well as during periods of communication with a base station and/or other mobile devices via the base station. The amount of power consumed by a mobile device can depend in part on the configuration of the mobile device and/or function (e.g., operation) being performed by the mobile device. Reducing the amount of power utilized by a mobile device is desirable as such reduction can result in extended battery life and decreased cost to use the mobile device and battery. Nonetheless, during "sleep" modes measurement behaviors for the UE is not clear, and its interaction with measurement behavior in connected mode not well defined.

SUMMARY

The following presents a simplified summary in order to provide a basic understanding of some aspects of the disclosed aspects. This summary is not an extensive overview and is intended to neither identify key or critical elements nor delineate the scope of such aspects. Its purpose is to present some concepts of the described features in a simplified form as a prelude to the more detailed description that is presented later.

In accordance with one or more aspects and corresponding disclosure thereof, various aspects are described in connection with providing a framework to initiate measurement by a user equipment (UE) in connected mode and while in discontinuous operation (e.g., DRX). Various aspects of the subject innovation enable the UE to autonomously (e.g., independent of instructions from network) enter a state of measurement, and generate a measurement report for the network, when quality of serving cell falls below the threshold of S_Intrasearch parameter,—which represents a predetermined threshold of quality as configured by the network. When the UE enters such state of measurement, the UE engages in continuous measurement and obtains adequate samples from the physical layer, to generate a measurement evaluation by the UE for current frequency. Subsequently, the UE can send such measurement report for the current frequency to the network, and hence can act as a trigger for the network to then allocate a measurement gap for a possible handover command, or enable measurement gaps.

Accordingly, such sending the measurement report of the current frequency can serve a dual function of: 1) perform handover for the network; and 2) trigger measurement gap for the measurement of other frequency or other radio access network. (e.g., for the UE to measure other frequencies the UE requires a measurement gap and a gap allocation.) In general, when the UE is in the DRX mode opportunities for obtaining measurement samples remain limited, and hence the UE cannot readily perform adequate and accurate measurement evaluation (e.g., for the current cell, intra cell frequency, intercell frequency). As such, in one aspect the subject innovation exploits UE behavior in DRX mode and reduces allocation of measurement gaps. Moreover, the UE is enabled to perform inter-frequency and/or inter-RAT measurements autonomously by employing the "natural gaps" from its DRX pattern, when adequate to perform such measurements. In addition, various aspects allow the network to designate for the UE: information related to measurement events that can be employed thereby to trigger a particular measurement (e.g., inter-frequency, intra-frequency, current frequency of serving sector, and the like); information related to type of measurements acquired by the UE; and information related to transmittal of a generated report to the network.

According to a related methodology, initially the UE is in a DRX mode, wherein the UE measurement is limited and only measures the serving cell quality and does not measure other nodes in same frequency. Subsequently, the UE detects that the radio quality of the serving cell falls below a predetermined parameter of the S_IntraSearch parameter (e.g., a predetermined network configured parameter). Subsequently the UE engages in the continuous measurement of inter-frequency measurements (e.g., measurement from the physical layer.) Thereafter, upon completing the measurements, a measurement report can be generated and sent by the UE to the network. Based on such report, the network can supply a gap allocation for the UE so that the UE can acquire other intra frequency measurements.

Another aspect relates to a wireless communication apparatus. The wireless communications apparatus can include at least one processor configured to detect that the radio quality of the serving cell falls below a predetermined parameter of the S_IntraSearch parameter (e.g., a predetermined network configured parameter), when the UE is in a DRX mode. The at least one processor can further be configured to enable the continuous measurement of inter-frequency measurements (e.g., measurement from the physical layer.)

Still another aspect relates to a computer program product, which can have a computer-readable medium having a code for causing at least one computer to detect that the radio quality of the serving cell falls below a predetermined parameter of the S_IntraSearch parameter—when the UE is in a DRX mode. Such code can further cause the at least one computer to receive a gap allocation by the UE to acquire other intra frequency measurements.

According to a further aspect, the network can pre-configure the UE to start inter-frequency and/or inter-RAT (Radio Access Technology) measurement automatically if a predetermined measurement event criteria is triggered (e.g. serving cell quality falls below a threshold value. Such mitigates a requirement for transfer of measurement report and gap allocation. Hence, complete UE autonomy for starting inter-frequency, inter-RAT measurement as well as intra-frequency measurement is supplied.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed and the described embodiments are intended to include all such aspects and their equivalents.

DETAILED DESCRIPTION

Figure 1:
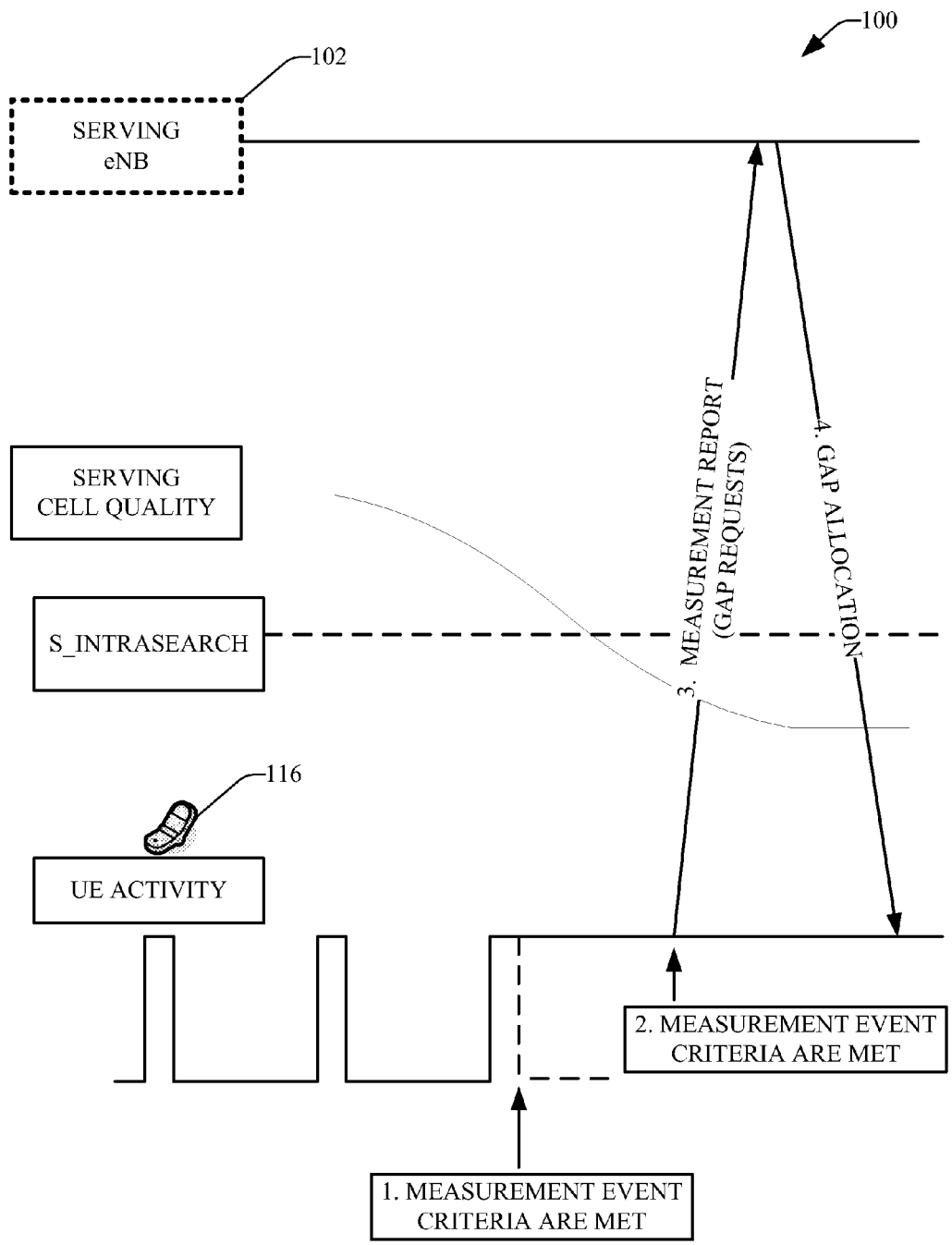
FIG. 1 illustrates an exemplary block diagram for managing measurement behavior of a user equipment (UE) according to various aspects.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, remote station, remote terminal, access terminal, user terminal, terminal, communication device, user agent, user device, or user equipment (UE). A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a Node B, or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM□, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2).

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

FIG. 1 illustrates an exemplary block diagram for managing measurement behavior of a UE according to an aspect. The system 100 provides a framework to initiate measurement by a UE in a connected mode and while in discontinuous operation (DRX). As illustrated in FIG. 1, the UE 116 is initially enabled to start measurement of the serving frequency. Once the UE 116 starts continuous measurements, various aspects evaluate the measurement events configured for the UE 116, by the network, for example. The discontinuous operation (DRX) can facilitate a reduction in power consumption in a communication device (e.g., mobile device).

For example, the UE 116 can employ a sleep mode controller that can facilitate selecting and/or switching to a desired sleep mode or discontinued operation based in part on predefined sleep mode criteria. Various aspects of the subject innovation enable the UE to autonomously (e.g., independent of instructions from network) to enter a state of measurement, and generate a measurement report for the network, when quality of serving cell falls below the threshold of S_Intrasearch parameter, which represents a predetermined threshold of quality as configured by the network. When the UE enters such Estate of measurement, the UE 116 engages in continuous measurement and obtains adequate samples from the physical layer, to generate a measurement evaluation by the UE for current frequency. Subsequently, the UE 116 can send such measurement report for the current frequency to the network, and hence can act as a trigger for the network to then allocate a measurement gap for a possible handover command, or enable measurement gaps.

In accordance with an aspect, the UE 116 can be configured so that such mobile device can transition (e.g., switch) between different modes, such as deep sleep (DS) mode, light sleep (LS) mode, and/or continuous reception (CRX) mode based in part on predefined sleep mode criteria. In one aspect, the mobile device (e.g., 116) can have cycles (e.g., discontinuous transmission (DTX)) where each cycle can include an "on" period where the mobile device can monitor transmissions from the base station or serving eNB 102 and/or an "off" period where the radio frequency (RF) generation can be turned off in the mobile device to facilitate reducing power consumption. The length of a particular cycle associated with a particular mode can be based in part on the total length of a respective "off" period combined with a respective "on" period within the cycle. Thus, for example, since the "off" period associated with DS mode can be longer than the "off" period associated with LS mode, the DRX cycle for DS mode can be longer in length than the DRX cycle for LS mode. In one aspect, the DS mode can have a cycle (e.g., DRX cycle) with a specified "off" period associated with discontinuous reception (DRX) that can be longer than the specified "off" period for a cycle associated with the LS mode or the specified "off" period for a cycle associated with the CRX mode (e.g., which can have its "off" period set to 0) to facilitate reducing power consumption (e.g., reduce use of battery power). During the "off" period, the mobile device (e.g., 116) can turn off (e.g., deactivate) its RF generation (for example, where there is also a discontinuous transmission (DTX) period as well), where during the "off" period the mobile device is not able to receive data or control information, in order to facilitate reducing power consumption. The DS mode also can have a specified "off" period associated with DTX that can be longer than the "off" period associated with the LS mode or the CRX mode (e.g., which can have its "off" period set to 0) to facilitate reducing power consumption. The DS mode can further have a specified "on" period of time during a cycle, where the "on" period can occur less frequently than an "on" period for the LS mode, and where the mobile device (e.g., 116) can receive certain information (e.g., control information) during such "on" periods. The DS mode can also have a specified "on" period of time during a DTX cycle. While in DS mode, the mobile device (e.g., 116) is not able to transmit data via the data channel, but can receive and/or transmit control information via the control channel during the "on" period (e.g., "on" intervals). In order to exchange data with the base station 102, the mobile device (e.g., 116) has to transition out of DS mode to either LS mode or CRX mode.

Each of the DS mode, LS mode, and CRX mode can be further configured based in part on respective CQI attributes, respective sounding reference signal (SRS) attributes, respective measurement events, and/or respective timer values, where the timer values can be utilized to facilitate determining when the mobile device (e.g., 116) is to transition from one mode to another mode. For example, CQI attributes can be configured or updated based in part on type of sleep mode, or transition from one sleep mode to another sleep mode.

With regard to the predefined sleep mode criteria, such criteria can relate to, for example, an explicit signal (e.g., control message) from the base station 102 indicating and/or directing the mobile device (e.g., 116) to transition from one mode to another mode (e.g., from LS mode to DS mode), and/or an implicit signal (e.g., lack of data communication associated with the mobile device for a predetermined period of time or more). The mobile device (e.g., 116) can monitor and analyze received information, such as control messages, data messages, and/or information regarding the length of time between events (e.g., receiving or sending a data transmission or control information), and/or the type of events that occur, and can control the selection of, and/or the switching between, the different modes based in part on the predefined sleep mode criteria. The mobile device (e.g., 116) also can track the length of time between events to facilitate determining whether the predetermined period of time has elapsed between particular events so as to trigger a transition from one mode to another mode. The mobile device (e.g., 116) can transition to LS mode or DS mode based in part on the predefined sleep mode criteria to facilitate reducing power consumption. As a result, the mobile device (e.g., 116) can facilitate reducing power consumption as compared to conventional mobile devices.

With regard to explicit signal, an explicit signal can include a L1/L2 control message, and/or an L1/L2 control message and a scheduled downlink of data (e.g. L1/L2 control channel+DL SCH), sent from the base station 102 to the mobile device (e.g., 116), where the predefined sleep mode criteria can provide that upon receiving such explicit signal, the mobile device is to transition from DS mode to LS mode (e.g., with regard to DRX and/or DTX), and the mobile device can transition from DS mode to LS mode, An explicit signal can be generated by the base station 102 and sent to the mobile device (e.g., 116), for instance, when the base station 102 knows that there will be no data exchanges, and/or there has been no data exchanges, between the base station 102 and the mobile device for a predefined period of time based in part on the predefined sleep mode criteria. The base station 102 also can track the amount of time that has elapsed between data exchanges with the mobile device (e.g., 116) to facilitate determining whether a predefined period of time has elapsed between data exchanges.

Figure 2:
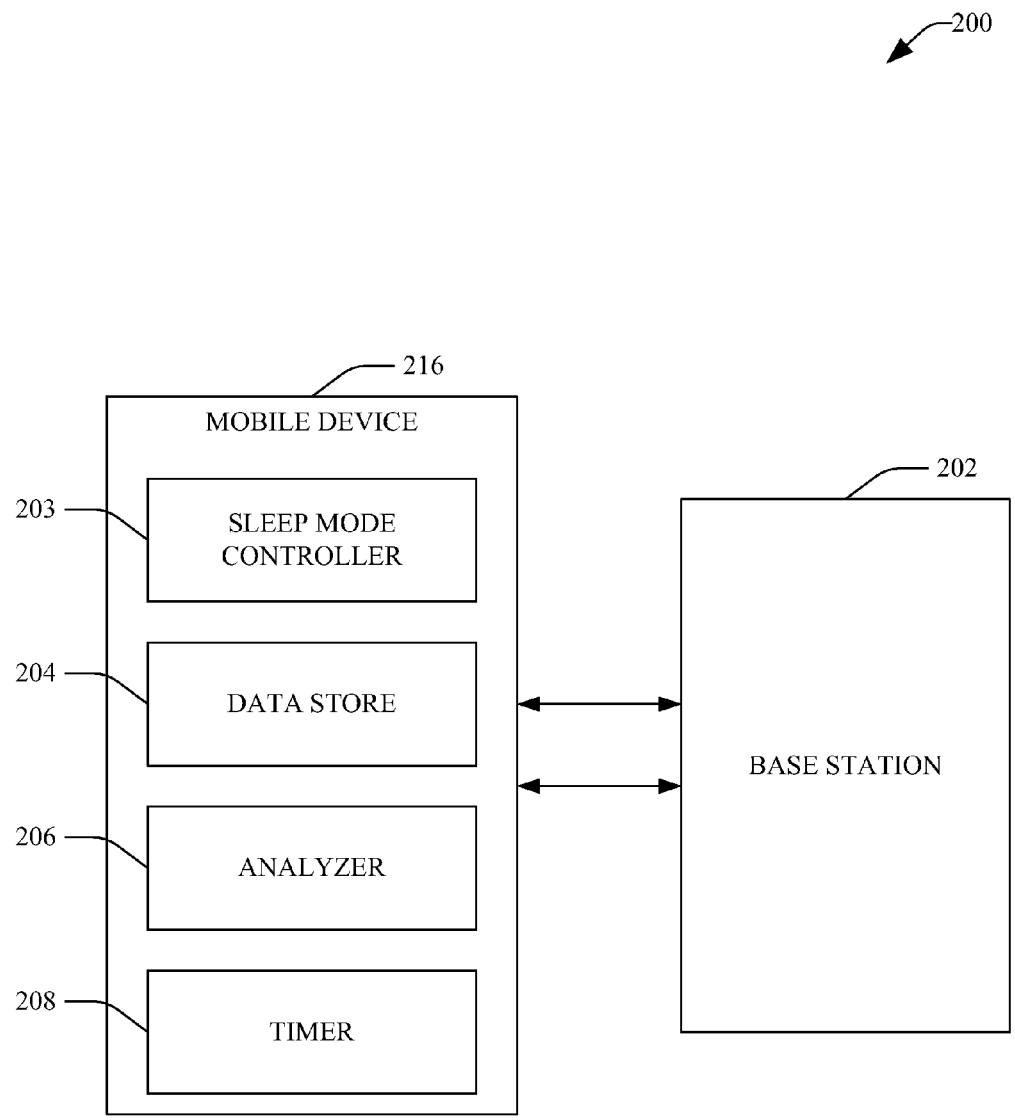
FIG. 2 illustrates an exemplary system that can facilitate generation of a measurement report associated with a mobile device within a wireless communication environment.

FIG. 2 illustrates a system 200 that can facilitate transitions between different sleep modes associated with a mobile device within a wireless communication environment. System 200 includes a base station 202 that can communicate with one or more mobile devices, such as UE 216. It is to be appreciated and understood that only one mobile device is depicted in FIG. 2 for clarity and brevity. Moreover, base station 202 can communicate with other base station(s) and/or any disparate devices (e.g., servers) (not shown) that can perform functions such as, for example, authentication, authorization, accounting, billing, and so forth. The base station 202 and UE 216 each can be respectively the same or similar as, and/or can comprise respectively the same or similar functionality as, respective components as more fully described herein, such as, for example, with regard to system 200.

UE 216 can be communicatively connected (e.g., wireless connection) with the base station 202, where the connection can comprise a data channel and a control channel. The data channel can facilitate transmission of data between the UE 216 and the base station 202, and the control channel can facilitate the transmission of control information between the mobile device and the base station 202. The following discussion provides examples for transition of the UE 216 among different modes.

In one particular example, the UE 216 can include a sleep mode controller 203 that can facilitate transitioning the UE 216 between the various sleep modes, such as DS mode, LS mode, and/or CRX mode (e.g., with regard to DRX and DTX) based in part on predefined sleep mode criteria that can be stored in data store 204. The sleep mode controller 203 can facilitate retrieving information associated with the predefined sleep mode criteria from the data store 204, and can provide the predefined sleep mode criteria to an analyzer component 206 that can evaluate received information regarding activity (e.g., data exchanges associated with the UE 216) and can compare such received information with the predefined sleep mode criteria to facilitate determining whether the UE 216 is to transition from one mode to another mode.

It will be appreciated that the data store 204 described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), flash memory, and/or nonvolatile random access memory (NVRAM). Volatile memory can include random access memory (RAM), which can act as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 608 of the subject systems and methods is intended to comprise, without being limited to, these and any other suitable types of memory.

The UE 216 can further include a timer 208 that can track the amount of time that has elapsed between the occurrence of events, such as, for instance, the amount of time that has elapsed between data exchanges associated with the UE 216. The timer 208 can provide information regarding the elapsed time between events to the sleep mode controller 203 and/or the analyzer 206 in order to facilitate determining whether the mobile device 216 has been inactive with respect to data exchanges for a predetermined amount of time or more, where such predetermined amount of time can be specified by the predefined sleep mode criteria, and where there can be disparate predetermined amounts of time employed with regard to the different types of transitions (e.g., one predetermined amount of time associated with determining whether to transition from CRX mode to LS mode; a disparate predetermined amount of time associated with determining whether to transition between LS mode and DS mode) and/or different types of transmissions (e.g., reception of data, transmission of data).

For example, the UE 216 can be in CRX mode, and the analyzer component 206 can receive time information from timer 208 indicating that there has not been a data exchange between the UE 216 and the base station 202 for two seconds. The analyzer 206 can compare such time information with the predefined sleep mode criteria, which in this example, can specify that the UE 216 is to be transitioned from CRX mode to LS mode if two or more seconds has elapsed since the last data exchange. The analyzer 206 can determine that the predefined sleep mode criteria has been met to transition from CRX mode to LS mode, and can communicate that determination to the sleep mode controller 203. The sleep mode controller 203 can facilitate transitioning (e.g., switching) the UE 216 from CRX mode to LS mode based in part on the determination and/or predefined sleep mode criteria. The elapsed time that meets the predefined sleep mode criteria for transitioning from CRX mode to LS mode can be an implicit signal to perform such transition.

As another example, a UE 216 can be in LS mode. The mobile device 216 can receive an explicit signal, such as an L1/L2 control channel or L1/L2 control+DL SCH, from the base station 202 that indicates that the UE 216 is to transition from the LS mode to the DS mode. Such message can be provided to the analyzer 206, which can compare the received message with the predefined sleep mode criteria, where such criteria can specify that a LS mode to DS mode transition should be performed upon receiving such a message, and the analyzer 206 can determine that there is to be a transition from LS mode to DS mode. The analyzer 206 can communicate such determination to the sleep mode controller 203, and the sleep mode controller 203 can facilitate transitioning the UE 216 from the LS mode to the DS mode.

As explained earlier, the UE 216 can autonomously (e.g., independent of instructions from network) enter a state of measurement, and generate a measurement report for the network, when quality of serving cell falls below the threshold of S_Intrasearch parameter, which represents a predetermined threshold of quality as configured by the network. When the UE enters such state of measurement, the UE engages in continuous measurement and obtains adequate samples from the physical layer, to generate a measurement evaluation by the UE for current frequency. Subsequently, the UE can send such measurement report for the current frequency to the network, and hence can act as a trigger for the network to then allocate a measurement gap for a possible handover command, or enable measurement gaps.

Figure 3:
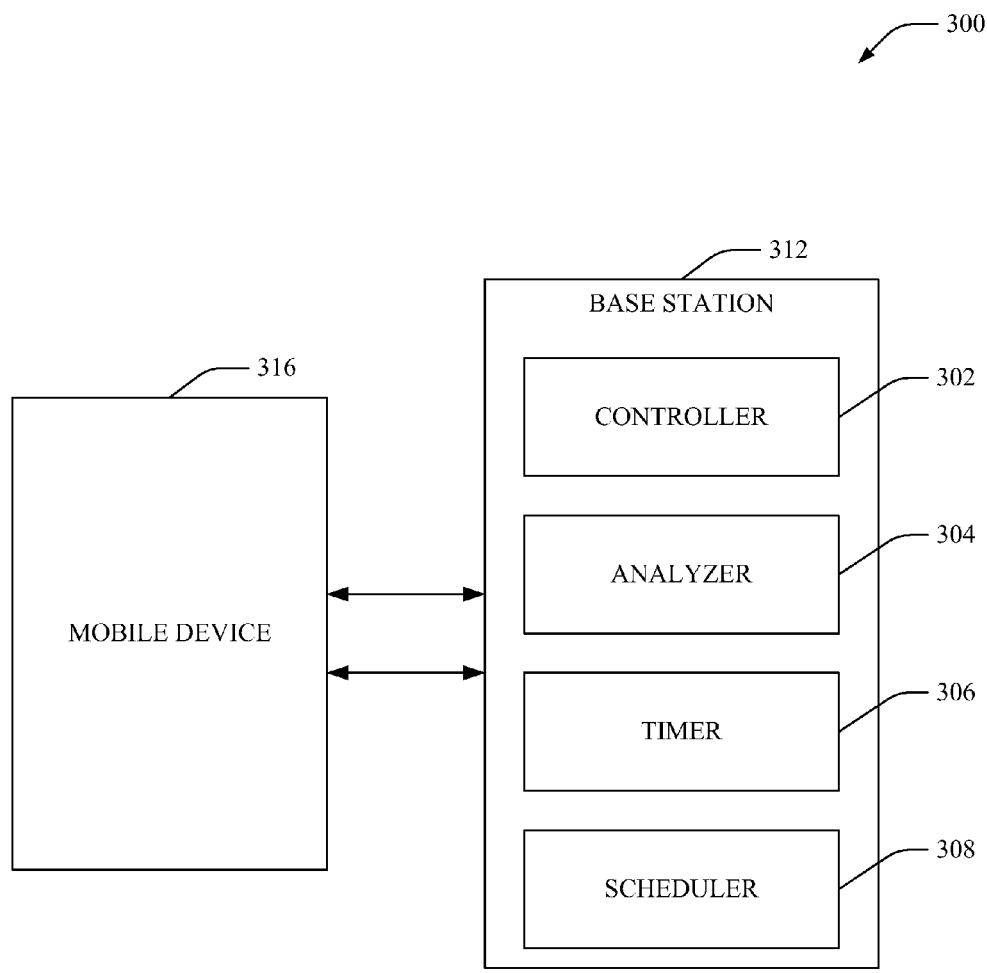
FIG. 3 illustrates a further system that can facilitate generation of a measurement report according to other aspects.

FIG. 3 illustrates a system 300 that implements receipt of the measurement report and further facilitates transitions between different sleep modes associated with a mobile device within a wireless communication environment. System 300 includes a base station 312 that can communicate with one or more mobile devices, such as mobile device 316. It is to be appreciated and understood that only one mobile device is depicted in FIG. 3 for clarity and brevity. Moreover, base station 312 can communicate with other base station(s) and/or any disparate devices (e.g., servers) (not shown) that can perform functions such as, for example, authentication, authorization, accounting, billing, and so forth.

The Base station 312 can include a controller 302 that can facilitate controlling transitions between various sleep modes in the mobile device 316. For example, the controller 302 in conjunction with analyzer 304 can facilitate evaluating and/or comparing information relevant to transition determinations in view of the predefined sleep mode criteria to facilitate determining whether to generate and send an explicit signal (e.g., control message) to the mobile device 316 directing the mobile device 316 to transition from one sleep mode to another mode.

The base station 312 also can include a timer 306 that can track the length of time that has elapsed between data exchanges, or from the last data exchange, between the base station 312 and the mobile device 316. The timer 306 can provide such time information to the controller 302 and/or analyzer 304, and such time information can be evaluated (e.g., compared) in relation to the predefined sleep mode criteria to facilitate determining whether a transition is to be performed.

The base station 312 can also comprise a scheduler 308 that can schedule uplink and/or downlink transmissions between the base station 312 and the mobile device 316. The scheduler 308 can schedule the downlink transmissions to occur when the mobile device 316 is in a "on" period or state (e.g., "on" period of LS mode, or CRX mode which can be in a continuous "on" state). The scheduler 308 also can schedule the uplink transmissions to occur when the mobile device 316 is in "on" period (e.g., "on" period of LS mode, or CRX mode which can be in a continuous "on" state). The scheduler 308 can facilitate transmitting desired control messages and/or associated data as part of the particular transmission. The base station can receive the measurement report from the UE or mobile device 316.

Figure 4:
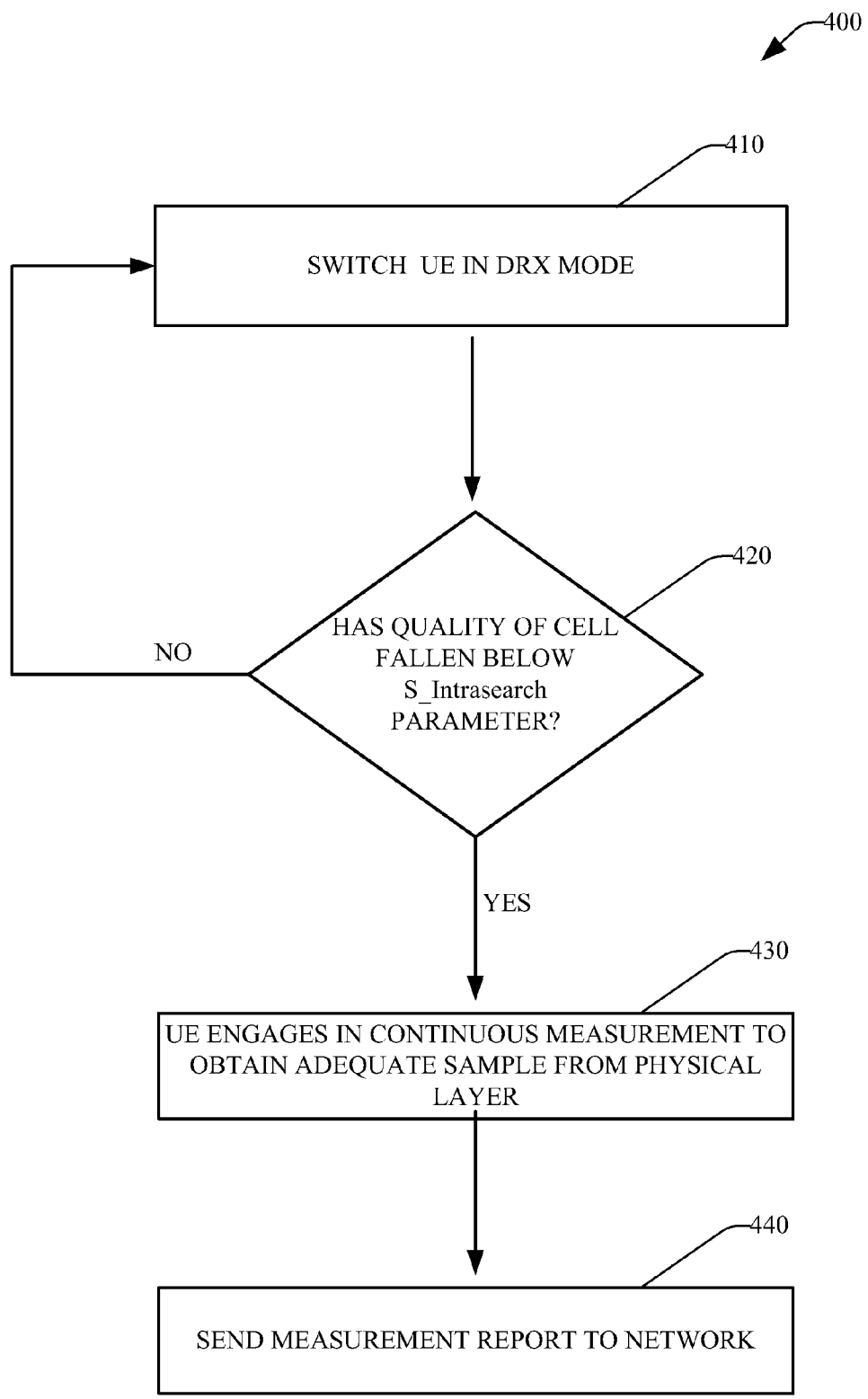
FIG. 4 illustrates a methodology of generating a measurement report by a UE in a discontinuous operation (DRX) according to one aspect.

FIG. 4 illustrates a related methodology 400 of providing a framework to initiate measurement by a UE in connected mode and while in discontinuous operation. While the exemplary method is illustrated and described herein as a series of blocks representative of various events and/or acts, the present invention is not limited by the illustrated ordering of such blocks. For instance, some acts or events may occur in different orders and/or concurrently with other acts or events, apart from the ordering illustrated herein, in accordance with the invention. In addition, not all illustrated blocks, events or acts, may be required to implement a methodology in accordance with the present invention. Moreover, it will be appreciated that the exemplary method and other methods according to the invention may be implemented in association with the method illustrated and described herein, as well as in association with other systems and apparatus not illustrated or described. Initially and at 410 the UE is switched into discontinuous operation mode such as a DRX. For example, the mobile device can employ an analyzer that can operate in conjunction with the sleep mode controller to evaluate information relevant to determining sleep mode transitions, such as explicit signals (e.g., message from base station instructing a change in sleep mode), implicit signals (e.g., no data exchanges between the mobile device and base station for a predetermined period of time), the current sleep mode state, and/or available sleep mode states in order to determine whether a condition is met based in part on the predefined sleep mode criteria such that a transition to a different sleep mode is to be performed. If such a condition is met, the sleep mode controller can facilitate transitioning from the current sleep mode to a different sleep mode to facilitate reducing power consumption by the mobile device.

Next and at 420, a determination is made to verify whether quality of serving cell falls below the threshold of S_Intrasearch parameter, which represents a predetermined threshold of quality as configured by the network. If so, at 430 the UE enters a state of measurement, wherein the UE engages in continuous measurement and obtains adequate samples from the physical layer, to generate a measurement evaluation by the UE for current frequency. Subsequently and at 440 the UE can send such measurement report for the current frequency to the network.

Figure 5:
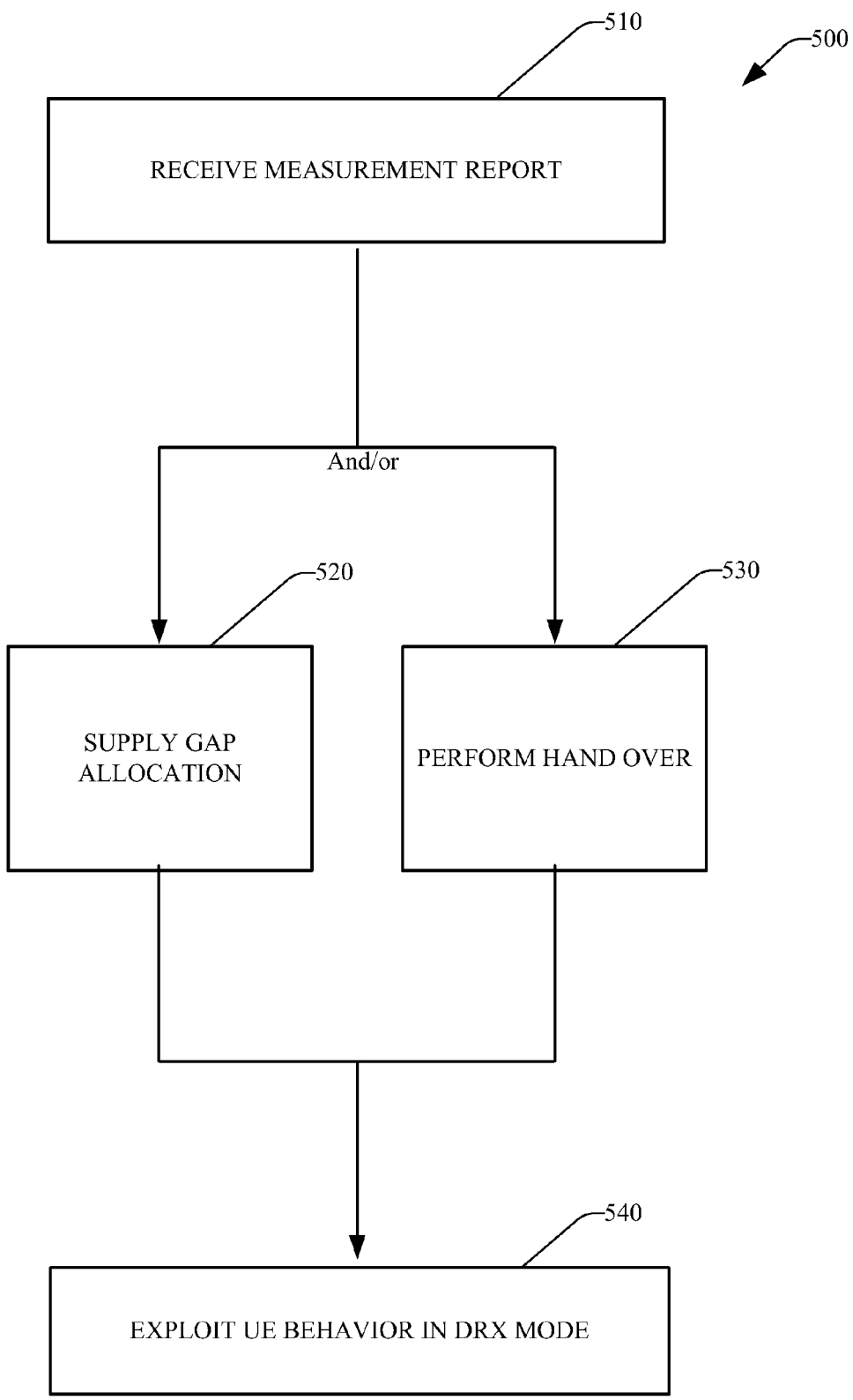
FIG. 5 illustrates a further methodology of employing the measurement report generated by the UE in the DRX mode.

FIG. 5 illustrates a further methodology 500, wherein at 510 the network receives the measurement report from a UE, which is associated with a serving cell having a quality of service that falls beneath a predetermined parameter (e.g., S_Intrasearch parameter). Such sending the measurement report of the current frequency can serve a dual function of: performing handover for the network at 520 and/or triggering measurement gap for the measurement of other frequency or other radio access network at 530 (e.g., for the UE to measure other frequencies the UE requires a measurement gap and a gap allocation.) In general, when the UE is in the DRX mode opportunities for obtaining measurement samples remain limited, and hence the UE can not readily perform adequate and accurate measurement evaluation (e.g., for the current cell, intra cell frequency, intercell frequency). Hence, the methodology 500 exploits UE behavior in DRX mode at 540, and hence reduces allocation of measurement gaps. Moreover, the UE is enabled to perform inter-frequency and/or inter-RAT measurements autonomously by employing the "natural gaps" from its DRX pattern, when adequate to perform such measurements. As explained earlier, various aspects allow the network to designate for the UE: information related to measurements events that can be employed thereby to trigger a particular measurement (e.g., inter-frequency, intra-frequency, current frequency of serving sector, and the like); information related to type of measurements acquired by the UE; and information related to transmittal of a generated report to the network.

In another aspect, complete UE autonomy for starting inter-frequency, inter-RAT measurement as well as intra-frequency measurement can also be supplied. For example, the UE can be pre-configured by the network to start inter-frequency and/or inter-RAT (Radio Access Technology) measurement automatically if a predetermined measurement event criteria is triggered (e.g. serving cell quality falls below a threshold value. Such mitigates a requirement for transfer of measurement report and gap allocation. Hence, complete UE autonomy for starting inter-frequency, inter-RAT measurement as well as intra-frequency measurement can also be supplied.

Figure 6:
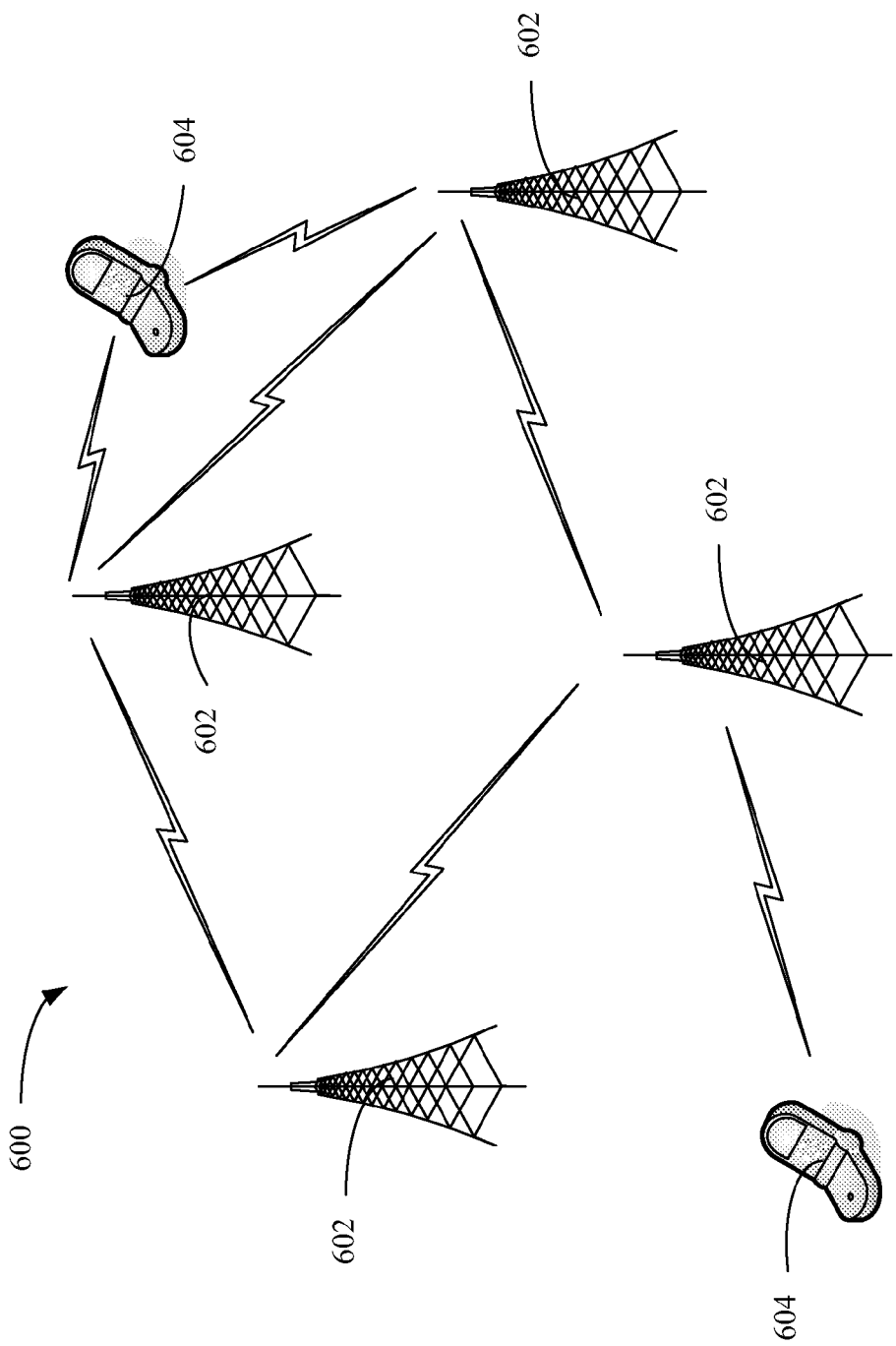
FIG. 6 illustrates a wireless communication according to an aspect of the subject innovation.

FIG. 6 illustrates a wireless communication system 600 in accordance with various aspects presented herein. System 600 can comprise one or more base stations 602 in one or more sectors that receive, transmit, repeat, and so forth, wireless communication signals to each other and/or to one or more mobile devices 604. Each base station 602 can comprise multiple transmitter chains and receiver chains (e.g., one for each transmit and receive antenna), each of which can in turn comprise a plurality of components associated with signal transmission and reception (e.g., processors, modulators, multiplexers, demodulators, demultiplexers, antennas, and so forth). Each mobile device 604 can comprise one or more transmitter chains and receiver chains, which can be utilized for a multiple input multiple output (MIMO) system. Each transmitter and receiver chain can comprise a plurality of components associated with signal transmission and reception (e.g. processors, modulators, multiplexers, demodulators, demultiplexers, antennas, an so on), as will be appreciated by one skilled in the art.

During a hand over form a base station to another base station the UE 604 or the mobile device reports the measurement of source eNB and signal strength to a source node. If the source eNB determines to perform a handover, a handover request is sent from the source eNB to the target eNB.

As explained earlier aspects of the subject innovation enable the UE to autonomously (e.g., independent of instructions from network) to enter a state of measurement, and generate a measurement report for the network, when quality of serving cell falls below the threshold of S_Intrasearch parameter. When the UE enters such state of measurement, the UE engages in continuous measurement and obtains adequate samples from the physical layer, to generate a measurement evaluation by the UE for current frequency. Subsequently, the UE can send such measurement report for the current frequency to the network, and hence can act as a trigger for the network to then allocate a measurement gap for a possible handover command, or enable measurement gaps.

Figure 7:
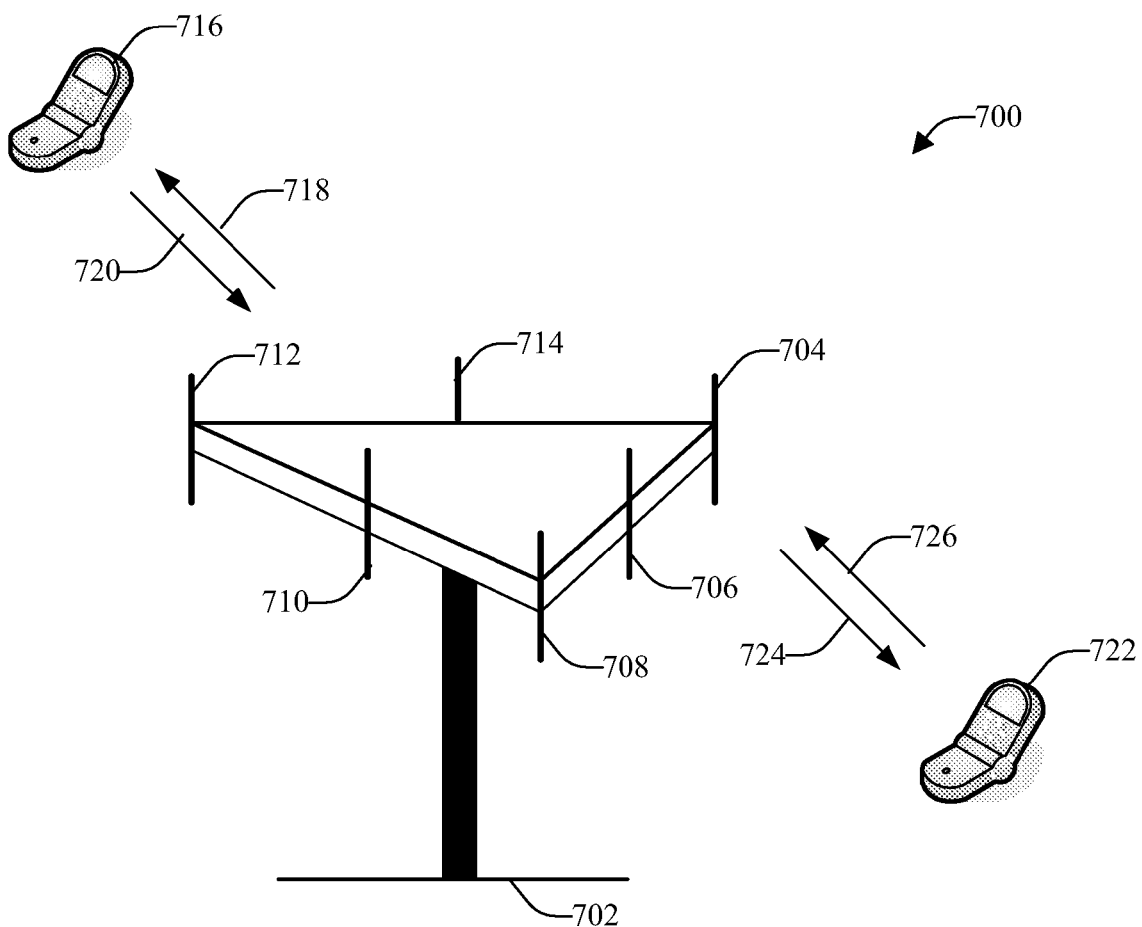
FIG. 7 illustrates a further wireless communication according to an additional aspect.

FIG. 7 illustrates a multiple access wireless communication system 700 according to one or more aspects is illustrated. A wireless communication system 700 can include one or more base stations in contact with one or more user devices. Each base station provides coverage for a plurality of sectors. A three-sector base station 702 is illustrated that includes multiple antenna groups, one including antennas 704 and 706, another including antennas 708 and 710, and a third including antennas 712 and 714. As illustrated in FIG. 7, only two antennas are shown for each antenna group, however, more or fewer antennas may be utilized for each antenna group. Mobile device 716 is in communication with antennas 712 and 714, where antennas 712 and 714 transmit information to mobile device 716 over forward link 718 and receive information from mobile device 716 over reverse link 720.

Forward link (or downlink) refers to the communication link from the base stations to mobile devices, and the reverse link (or uplink) refers to the communication link from mobile devices to the base stations. Mobile device 722 is in communication with antennas 704 and 706, where antennas 704 and 706 transmit information to mobile device 722 over forward link 724 and receive information from mobile device 722 over reverse link 726. In a FDD system, for example, communication links might utilize different frequencies for communication. For example, forward link 718 might use a different frequency than the frequency utilized by reverse link 720.

Each group of antennas and/or the area in which they are designated to communicate may be referred to as a sector of base station 702. In one or more aspects, antenna groups each are designed to communicate to mobile devices in a sector or the areas covered by base station 702. A base station may be a fixed station used for communicating with the terminals.

In communication over forward links 718 and 724, the transmitting antennas of base station 702 can utilize beamforming in order to improve a signal-to-noise ratio of forward links for the different mobile devices 716 and 722. Also, a base station utilizing beamforming to transmit to mobile devices scattered randomly through its coverage area might cause less interference to mobile devices in neighboring cells than the interference that can be caused by a base station.

Figure 8:
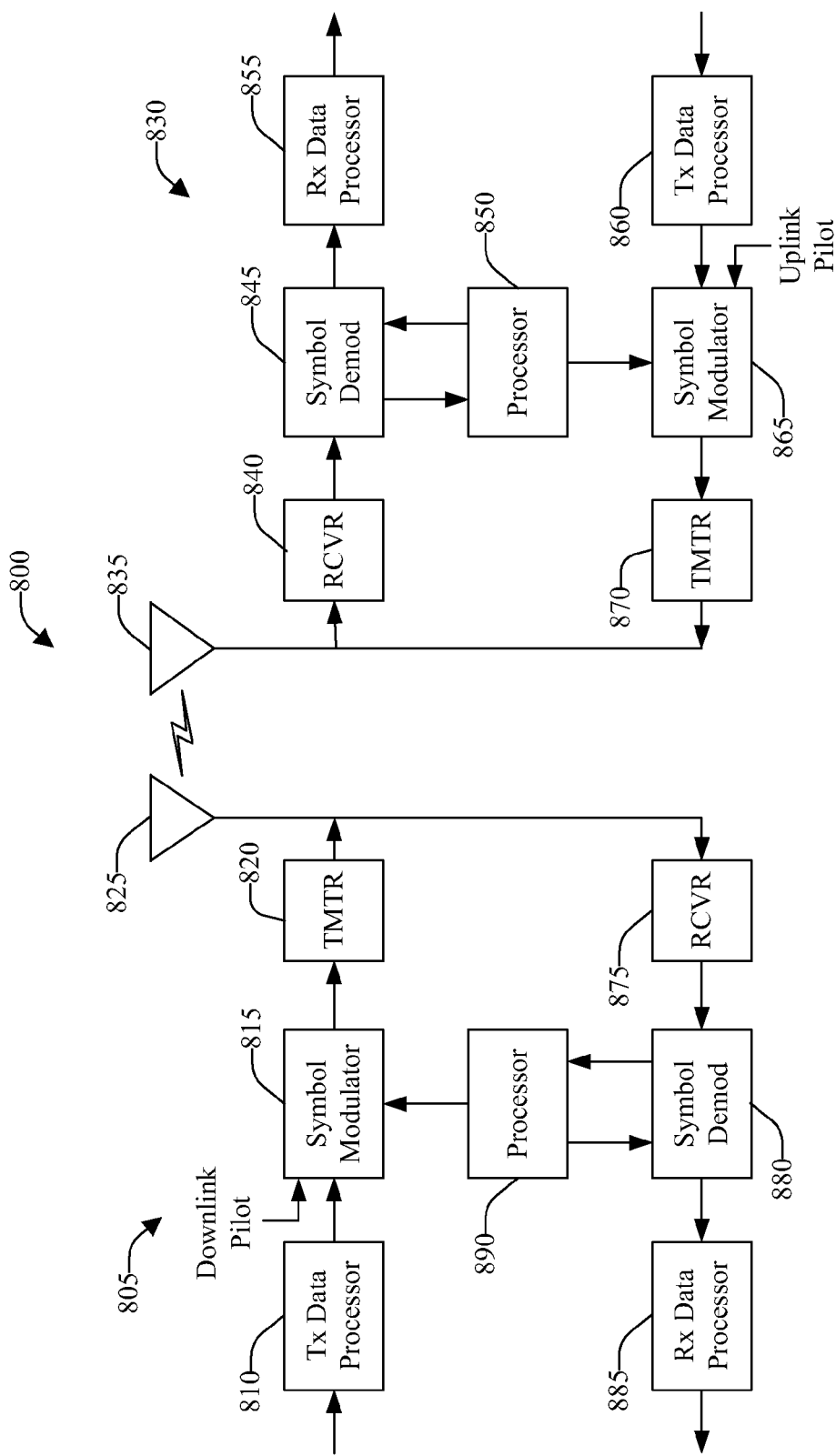
FIG. 8 illustrates a multiple access wireless communication system according to one or more aspects.

FIG. 8 illustrates an exemplary wireless communication system 800. Wireless communication system 800 depicts one base station and one terminal for sake of brevity. However, it is to be appreciated that system 800 can include more than one base station or access point and/or more than one terminal or user device, wherein additional base stations and/or terminals can be substantially similar or different from the exemplary base station and terminal described below. In addition, it is to be appreciated that the base station and/or the terminal can employ the systems and/or methods described herein to facilitate wireless communication there between.

As illustrated in FIG. 8, on a downlink, at access point 805, a transmit (TX) data processor 810 receives, formats, codes, interleaves, and modulates (or symbol maps) traffic data and provides modulation symbols ("data symbols"). A symbol modulator 815 receives and processes the data symbols and pilot symbols and provides a stream of symbols. A symbol modulator 815 multiplexes data and pilot symbols and obtains a set of N transmit symbols. Each transmit symbol may be a data symbol, a pilot symbol, or a signal value of zero. The pilot symbols may be sent continuously in each symbol period. The pilot symbols can be frequency division multiplexed (FDM), orthogonal frequency division multiplexed (OFDM), time division multiplexed (TDM), frequency division multiplexed (FDM), or code division multiplexed (CDM).

A transmitter unit (TMTR) 820 receives and converts the stream of symbols into one or more analog signals and further conditions (erg., amplifies, filters, and frequency upconverts) the analog signals to generate a downlink signal suitable for transmission over the wireless channel. The downlink signal is then transmitted through an antenna 825 to the terminals. At terminal 830, an antenna 835 receives the downlink signal and provides a received signal to a receiver unit (RCVR) 840. Receiver unit 840 conditions (e.g., filters, amplifies, and frequency downconverts) the received signal and digitizes the conditioned signal to obtain samples. A symbol demodulator 845 obtains N received symbols and provides received pilot symbols to a processor 850 for channel estimation. Symbol demodulator 845 further receives a frequency response estimate for the downlink from processor 850, performs data demodulation on the received data symbols to obtain data symbol estimates (which are estimates of the transmitted data symbols), and provides the data symbol estimates to an RX data processor 855, which demodulates (i.e., symbol demaps), deinterleaves, and decodes the data symbol estimates to recover the transmitted traffic data. The processing by symbol demodulator 845 and RX data processor 855 is complementary to the processing by symbol modulator 815 and TX data processor 810, respectively, at access point 805.

On the uplink, a TX data processor 860 processes traffic data and provides data symbols. A symbol modulator 865 receives and multiplexes the data symbols with pilot symbols, performs modulation, and provides a stream of symbols. A transmitter unit 870 then receives and processes the stream of symbols to generate an uplink signal, which is transmitted by the antenna 835 to the access point 805.

At access point 805, the uplink signal from terminal 830 is received by the antenna 825 and processed by a receiver unit 875 to obtain samples. A symbol demodulator 880 then processes the samples and provides received pilot symbols and data symbol estimates for the uplink. An RX data processor 885 processes the data symbol estimates to recover the traffic data transmitted by terminal 830. A processor 890 performs channel estimation for each active terminal transmitting on the uplink.

Processors 890 and 850 direct (e.g., control, coordinate, manage, . . . ) operation at access point 805 and terminal 830, respectively. Respective processors 890 and 850 can be associated with memory units (not shown) that store program codes and data. Processors 890 and 850 can also perform computations to derive frequency and impulse response estimates for the uplink and downlink, respectively.

For a multiple-access system (e.g., FDMA, OFDMA, CDMA, TDMA, and the like), multiple terminals can transmit concurrently on the uplink. For such a system, the pilot subbands may be shared among different terminals. The channel estimation techniques may be used in cases where the pilot subbands for each terminal span the entire operating band (possibly except for the band edges). Such a pilot subband structure would be desirable to obtain frequency diversity for each terminal. The techniques described herein may be implemented by various means. For example, these techniques may be implemented in hardware, software, or a combination thereof. For a hardware implementation, the processing units used for channel estimation may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. With software, implementation can be through modules (e.g., procedures, functions, and so on) that perform the functions described herein. The software codes may be stored in memory unit and executed by the processors 890 and 850.

Figure 9:
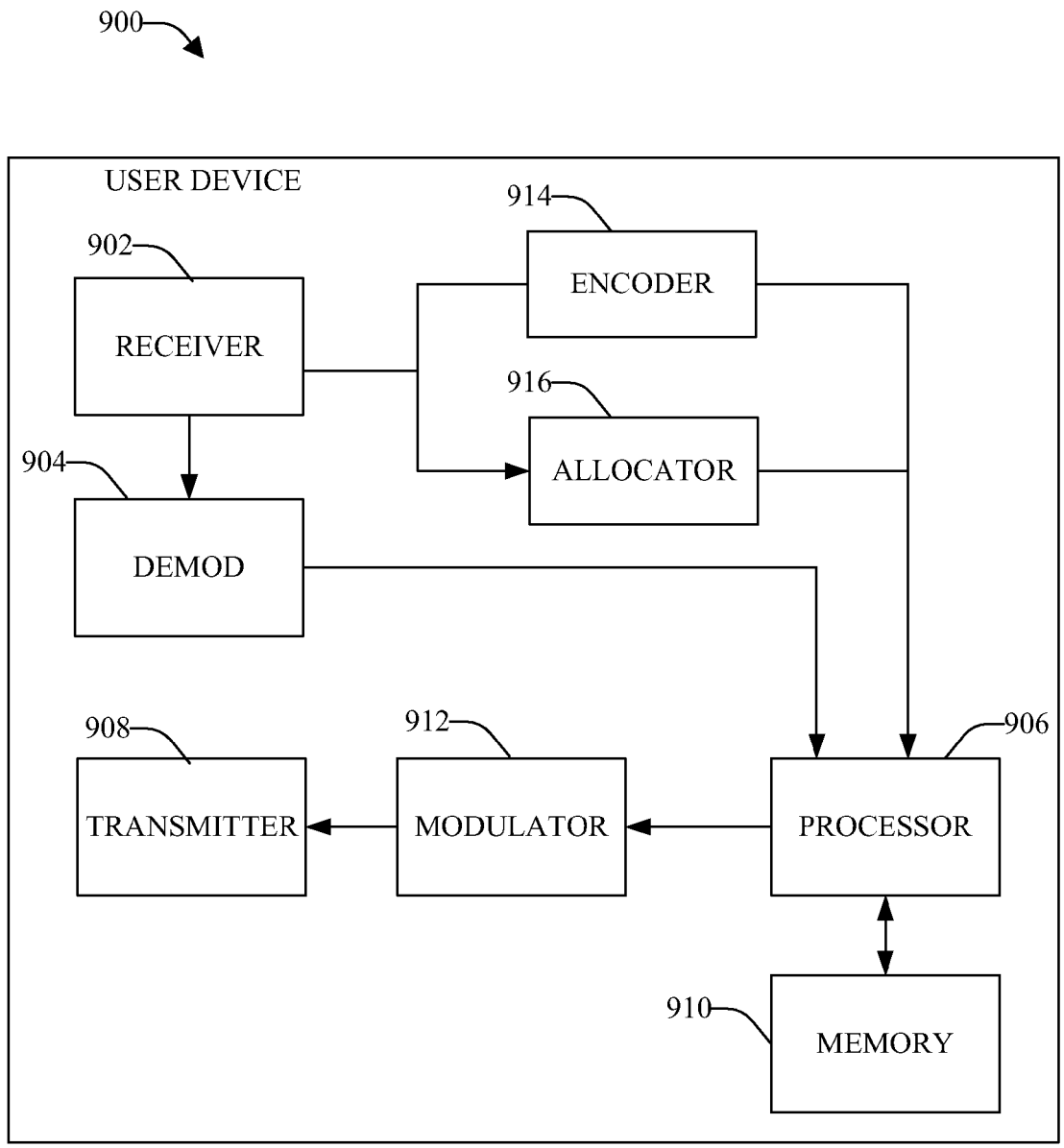
FIG. 9 illustrates a communication system that manages UE measurement behavior according to a further aspect.

With reference now to FIG. 9, illustrated is a user device 900 that can perform inter-frequency and/or inter-RAT measurements autonomously by employing the "natural gaps" from its DRX pattern, when adequate to perform such measurements. System 900 comprises a receiver 902 that can receive a signal from, for example, a receiver antenna. The receiver 902 can perform typical actions thereon, such as filtering, amplifying, downconverting, etc. the received signal. The receiver 902 can also digitize the conditioned signal to obtain samples. A demodulator 904 can obtain received symbols for each symbol period, as well as provide received symbols to a processor 906.

Processor 906 can be a processor dedicated to analyzing information received by receiver component 902 and/or generating information for transmission by a transmitter 908. In addition or alternatively, processor 906 can control one or more components of user device 900, analyze information received by receiver 902, generate information for transmission by transmitter 908, and/or control one or more components of user device 900. Processor 906 may include a controller component capable of coordinating communications with additional user devices.

User device 900 can additionally comprise memory 908 operatively coupled to processor 906 and that can store information related to coordinating communications and any other suitable information. Memory 910 can additionally store protocols associated with sample rearrangement. It will be appreciated that the data store (e.g., memories) components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 908 of the subject systems and/or methods is intended to comprise, without being limited to, these and any other suitable types of memory. User device 900 can farther comprise a symbol modulator 912 and a transmitter 908 that transmits the modulated signal.

Receiver 902 is further operatively coupled to an encoder 914 that scrambles a Walsh Sequence with a random sequence to produce a scrambled sequence. The encoder 914 can be provided with the random sequence so that a single FHT can be utilized to decode the sequence. Additionally, receiver 902 can be operatively coupled to an allocator 916 that receive an assignment of one or more sub-sequences of the scrambled sequence. The transmitter 908 can send the scrambled sequence as an access-based handoff probe. In response to the access probe, receiver 902 can receive an Access Grant, which can be transmitted over a Shared Signaling MAC Protocol.

Figure 10:
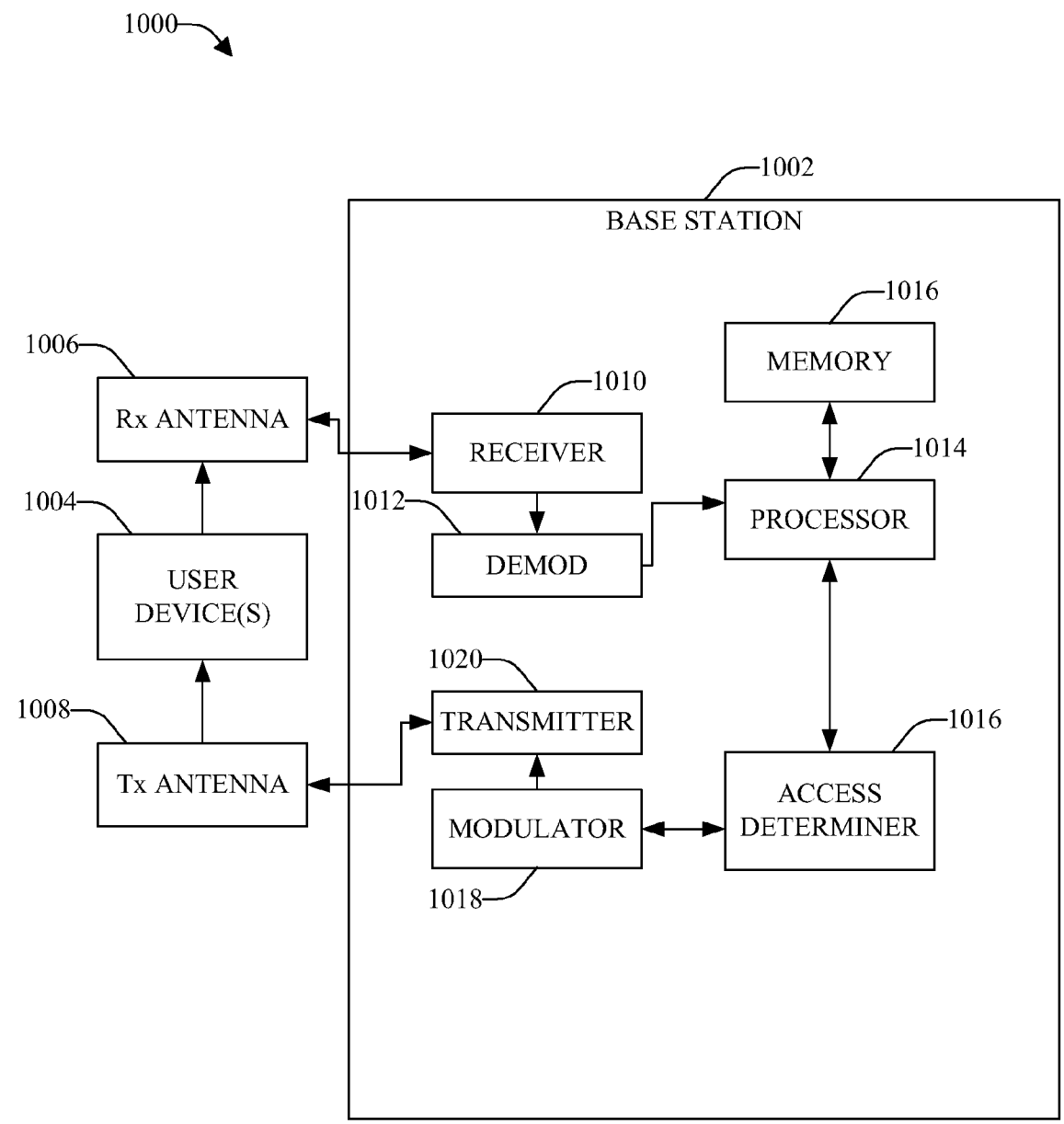
FIG. 10 illustrates a further communication system for managing DRX mode measurement behavior according to a further aspect.

FIG. 10 is an illustration of a system 1000 that facilitates triggering measurement gap for the measurement of other frequency or other radio access network. As illustrated, base station 1002 receives signal(s) from one or more user devices 1004 by a receive antenna 1006, and transmits to the one or more user devices 1004 through a transmit antenna 1008.

Base station 1002 comprises a receiver 1010 that receives information from receive antenna 1006 and is operatively associated with a demodulator 1012 that demodulates received information. Demodulated symbols are analyzed by a processor 1014 that is coupled to a memory 1016 that stores information related to broadcast-multicast waveforms embedded in a unicast waveform. A modulator 1018 can multiplex the signal for transmission by a transmitter 1020 through transmit antenna 1008 to user devices 1004.

Processor 1014 is further coupled to an access determiner 1016. Receiver 1010 can receive an access probe from one or more mobile devices that desire to gain access to a sector served by base station 1002. Demodulator 1012 can demodulate a Walsh Sequence included in the access probe utilizing an FHT. Access determiner 1016 can selectively Grant the one or more mobile devices access to the sector.

In an aspect, logical channels are classified into Control Channels and Traffic Channels. Logical Control Channels comprises Broadcast Control Channel (BCCH) which is DL channel for broadcasting system control information. Paging Control Channel (PCCH) which is DL channel that transfers paging information. Multicast Control Channel (MCCH) which is Point-to-multipoint DL channel used for transmitting Multimedia Broadcast and Multicast Service (MBMS) scheduling and control information for one or several MTCHs. Generally, after establishing RRC connection this channel is only used by UEs that receive MBMS (Note: old MCCH+MSCH). Dedicated Control Channel (DCCH) is Point-to-point bidirectional channel that transmits dedicated control information and used by UEs having an RRC connection. In one aspect, Logical Traffic Channels includes a Dedicated Traffic Channel (DTCH) that is Point-to-point bidirectional channel, dedicated to one UE, for the transfer of user information. Also, one can employ a Multicast Traffic Channel (MTCH) for Point-to-multipoint DL channel for transmitting traffic data.

In another aspect, Transport Channels are classified into DL and UL. DL Transport Channels comprises a Broadcast Channel (BCH), Downlink Shared Data Channel (DL-SDCH) and a Paging Channel (PCH), the PCH for support of UE power saving (DRX cycle is indicated by the network to the UE), broadcasted over entire cell and mapped to PHY resources which can be used for other control/traffic channels. The UL Transport Channels comprises a Random Access Channel (RACH), a Request Channel (REQCH), a Uplink Shared Data Channel (UL-SDCH) and pluarlity of PHY channels. The PHY channels comprises a set of DL channels and UL channels.

The DL PHY channels comprises:
Common Pilot Channel (CPICH)
Synchronization Channel (SCH)
Common Control Channel (CCCH)
Shared DL Control Channel (SDCCH)
Multicast Control Channel (MCCH)
Shared UL Assignment Channel (SUACH)
Acknowledgement Channel (ACKCH)
DL Physical Shared Data Channel (DL-PSDCH)
UL Power Control Channel (UPCCH)
Paging Indicator Channel (PICH)
Load Indicator Channel (LICH)

The UL PHY Channels comprises:
Physical Random Access Channel (PRACH)
Channel Quality Indicator Channel (CQICH)
Acknowledgement Channel (ACKCH)
Antenna Subset Indicator Channel (ASICH)
Shared Request Channel (SREQCH)
UL Physical Shared Data Channel (UL-PSDCH)
Broadband Pilot Channel (BPICH)

Figure 11:
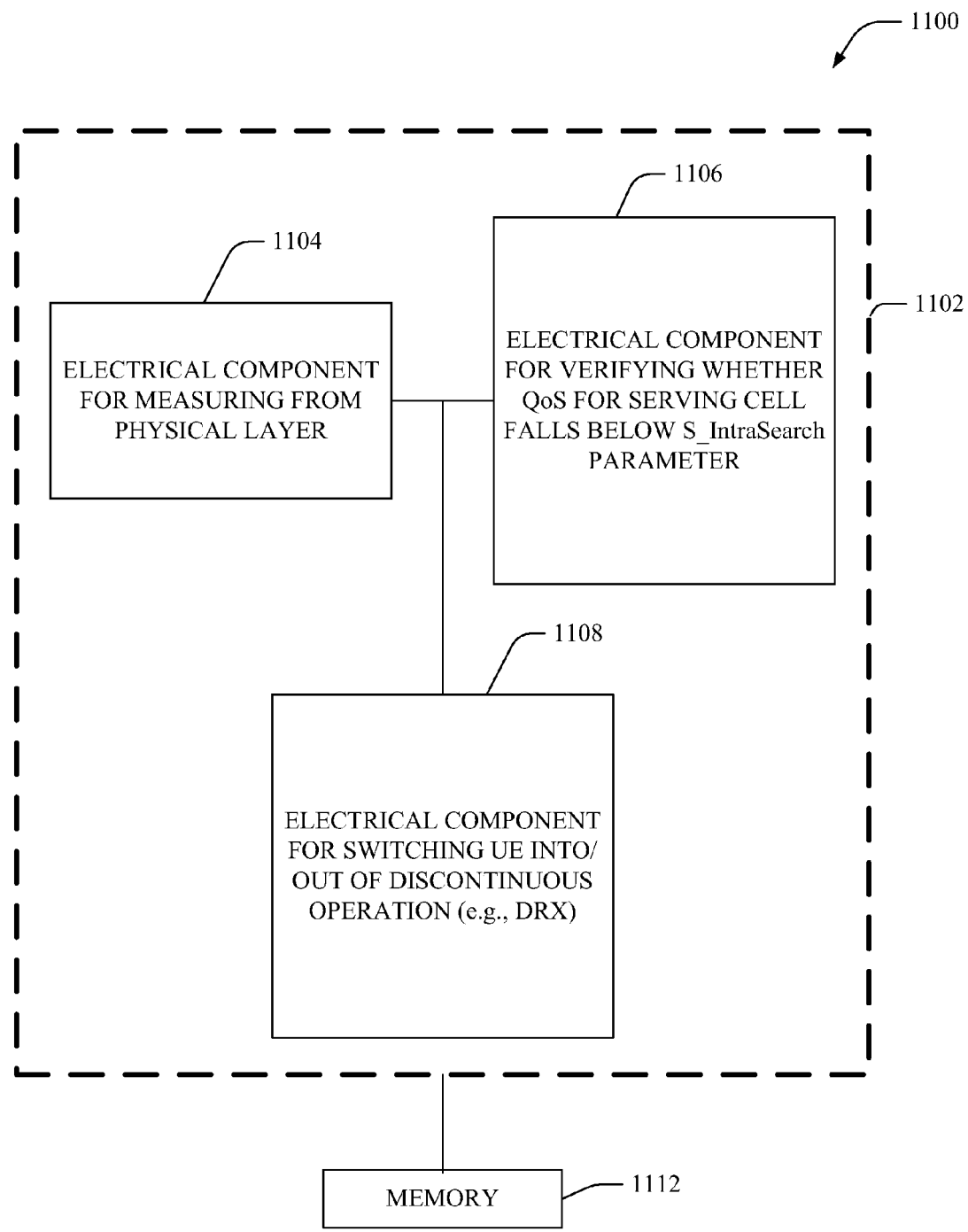
FIG. 11 is an illustration of a system that facilitates generation of a report by a UE in DRX mode according to an aspect of the subject innovation.

FIG. 11 illustrates a particular system 1100 that enables a framework to initiate measurement by a UE in connected mode and while in discontinuous operation (e.g., DRX). Such framework enables the UE to autonomously (e.g., independent of instructions from network) to enter a state of measurement, and generate a measurement report for the network, when quality of serving cell falls below the threshold of S_Intrasearch parameter, which represents a predetermined threshold of quality as configured by the network.

The system 1100 can be associated with a UE and includes a grouping 1102 of components that can communicate with one another in connection with a handover from a source eNB to a target eNB and/or triggering a measurement gap for the measurement of other frequency or other radio access network. Grouping 1102 also includes an electrical component 1106 for verifying whether QoS for serving cell has fallen below a predetermined S_IntraSearch parameter. In addition, electrical component 1108 enables the UE to switch in and out of discontinuous operation (e.g., DRX). As explained earlier, when the UE is in the DRX mode opportunities for obtaining measurement samples remain limited, and hence the UE can not readily perform adequate and accurate measurement evaluation (e.g., for the current cell, intra cell frequency, intercell frequency). As such, in one aspect the subject innovation exploits UE behavior in DRX mode and reduces allocation of measurement gaps. Moreover, the UE is enabled to perform inter-frequency and/or inter-RAT measurements autonomously by employing the "natural gaps" from its DRX pattern, when such are adequate to perform the measurements. In addition, various aspects allow the network to designate for the UE: information relate to measurements events that can be employed thereby to trigger a particular measurement (e.g., inter-frequency, intra-frequency, current frequency of serving sector, and the like); information related to type of measurements acquired by the UE; and information related to transmittal of a generated report to the network. As illustrated, the electrical components 1104 provide for measuring from the physical layer to generate a measurement evaluation by the UE for current frequency.

For the purposes of the present document, the following abbreviations apply:
AM Acknowledged Mode
AMD Acknowledged Mode Data
ARQ Automatic Repeat Request
BCCH Broadcast Control CHannel
BCH Broadcast CHannel
C- Control-
CCCH Common Control CHannel
CCH Control CHannel
CCTrCH Coded Composite Transport Channel
CP Cyclic Prefix
CRC Cyclic Redundancy Check
CTCH Common Traffic CHannel
DCCH Dedicated Control CHannel
DCH Dedicated CHannel
DL DownLink
DSCH Downlink Shared CHannel
DTCH Dedicated Traffic CHannel
FACH Forward link Access CHannel
FDD Frequency Division Duplex
L1 Layer 1 (physical layer)
L2 Layer 2 (data link layer)
L3 Layer 3 (network layer)
LI Length Indicator
LSB Least Significant Bit
MAC Medium Access Control
MBMS Multmedia Broadcast Multicast Service
MCCHMBMS point-to-multipoint Control CHannel
MRW Move Receiving Window
MSB Most Significant Bit
MSCH MBMS point-to-muiltipoint Scheduling CHannel
MTCH MBMS point-to-multipoint Traffic CHannel
PCCH Paging Control CHannel
PCH Paging CHannel
PDU Protocol Data Unit
PHY PHYsical layer
PhyCH Physical CHannels
RACH Random Access CHannel
RLC Radio Link Control
RRC Radio Resource Control SAP Service Access Point
SDU Service Data Unit
SHCCH SHared channel Control CHannel
SN Sequence Number
SUFI SUper FIeld
TCH Traffic CHannel
TDD Time Division Duplex
TFI Transport Format Indicator
TM Transparent Mode
TMD Transparent Mode Data
TTI Transmission Time Interval
U- User-
UE User Equipment
UL UpLink
UM Unacknowledged Mode
UMD Unacknowledged Mode Data
UMTS Universal Mobile Telecommunications System
UTRA UMTS Terrestrial Radio Access
UTRAN UMTS Terrestrial Radio Access Network
MBSFN multicast broadcast single frequency network
MCE MBMS coordinating entity
MCH multicast channel
DL-SCH downlink shared channel
MSCH MBMS control channel
PDCCH physical downlink control channel
PDSCH physical downlink shared channel What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method of initiating measurement report by a user equipment, comprising:
    placing the user equipment in a discontinuous reception mode;
    initiating continuous inter-frequency measurement by the user equipment when a quality of service of a serving cell falls below a threshold parameter, wherein the continuous inter-frequency measurement obtains samples from a physical layer; and
    sending a measurement evaluation to a network for allocation of a measurement gap for acquiring an intra-frequency measurement.

2. The method of claim 1, further comprising creating the measurement evaluation of a current frequency based on the continuous measurement.

3. The method of claim 2, further comprising triggering a handoff based on the measurement evaluation.

4. The method of claim 2, further comprising performing an inter-radio access technology measurement.

5. The method of claim 4, further comprising initiating the inter-frequency measurement or the inter-radio access technology measurement autonomously by the user equipment.

6. The method of claim 5, further comprising starting the inter-frequency measurement or the inter-radio access technology measurement when cell quality falls below a threshold value.

7. The method of claim 2, further comprising generating a measurement report for sending to the network.

8. The method of claim 1, further comprising implementing a sleep mode controller to facilitate the placing act.

9. The method of claim 1, wherein the placing act is based on channel quality indicator attributes.

10. A wireless communications apparatus, comprising:
    at least one processor configured to:
        switch a user equipment to a discontinuous reception mode:,
        initiate continuous inter-frequency measurement by the user equipment when a quality of service of a serving cell falls below a predetermined threshold;
        create a measurement evaluation based on the continuous measurement; and
        send the measurement evaluation to a network for allocation of a measurement gap for acquiring an intra-frequency measurement.

11. The wireless communication apparatus of claim 10, wherein the at least one processor is further configured to perform an inter-radio access technology measurement.

12. The wireless communication apparatus of claim 10, wherein the at least one processor is further configured to switch into the discontinuous reception mode based on channel quality indicator attributes.

13. The wireless communication apparatus of claim 10, wherein the at least one processor is further configured to trigger a handoff based on the measurement evaluation.

14. The wireless communication apparatus of claim 10, wherein the at least one processor is further configured to generate a measurement report for sending to the network.

15. A wireless communication apparatus for managing measurement behavior of discontinuous reception mode user equipment, comprising:
    means for switching a user equipment into a discontinuous reception mode;
    means for starting a continuous inter-frequency measurement by the user equipment when a quality of service of a serving cell drops below a predetermined threshold parameter, wherein the continuous inter-frequency measurement obtains samples from a physical layer; and
    means for sending a measurement evaluation to a network for allocation of a measurement gap for acquiring an intra-frequency measurement.

16. The wireless communication system of claim 15, further comprising means for creating the measurement evaluation of a current frequency based on the continuous measurement.

17. The wireless communication system of claim 15, further comprising means for transmitting the measurement evaluation to the network associated with the user equipment for allocation of the measurement gap.

18. The wireless communication system of claim 15, further comprising means for performing an inter-radio access technology measurement.

19. A non-transitory computer-readable medium storing a computer program, wherein execution of the computer program is for:
    causing at least one computer to place a user equipment in a discontinuous reception mode;
    initiating continuous inter-frequency measurement by the user equipment when a quality of service of a serving cell falls below a threshold parameter, wherein the continuous measurement obtains samples from a physical layer; and sending a measurement evaluation to a network for allocation of a measurement gap for acquiring an intra-frequency measurement.

20. The non-transitory computer-readable medium of claim 19, wherein execution of the computer program is also for triggering a handoff based on the measurement evaluation.

21. The non-transitory computer-readable medium of claim 19, wherein execution of the computer program is also for generating a measurement report for sending to the network.

22. A method of managing measurement behavior of a discontinuous reception mode user equipment, comprising:
receiving a measurement report by a network, wherein the measurement report is generated in a discontinuous reception mode of a user equipment when a quality of service of a serving cell associated therewith drops below a predetermined threshold; and
supplying a gap allocation by the network for the user equipment to facilitate intra-frequency and inter-frequency measurements thereby,
wherein the measurement report is generated based on continuous inter-frequency measurements by the user equipment.

23. The method of claim 22, wherein the predetermined threshold is a parameter configured by the network.

24. The method of claim 22, further comprising implementing a sleep mode controller to switch in and out of the discontinuous reception mode.

25. The method of claim 22, wherein the user equipment switched into the discontinuous reception mode based on channel quality indicator attributes.

26. A wireless communications apparatus, comprising:
at least one processor configured to:
receive a measurement report by a network, the measurement report generated in a discontinuous reception mode of a User equipment when a quality of service of a serving cell associated therewith drops below a predetermined threshold; and
provide a gap allocation by the network for the user equipment to facilitate intra-frequency and inter-frequency measurements thereby,
wherein the measurement report is generated based on continuous inter-frequency measurements by the user equipment.

27. The wireless communications apparatus of claim 26, wherein the predetermined threshold is configured by the network.

28. A non-transitory computer-readable medium storing a computer program, wherein execution of the computer program is for:
receiving a measurement report by a network, the measurement report generated in a discontinuous reception mode of a user equipment when a quality of service of a serving cell associated therewith drops below a predetermined threshold; and
supplying a gap allocation by the network for the user equipment to enable intra-frequency and inter-frequency measurements thereby,
wherein the measurement report is generated based on continuous inter-frequency measurements by the user equipment.

29. The non-transitory computer-readable medium of claim 28, wherein the predetermined threshold is a parameter configured by the network.

30. The non-transitory computer-readable medium of claim 28, wherein the user equipment is switchable into the discontinuous reception mode via a sleep mode controller.

* * * * *